No. 618,316. Patented Jan. 24, 1899.
S. L. ALLEN.
AGRICULTURAL IMPLEMENT.
(Application filed May 10, 1897.)
(No Model.) 2 Sheets—Sheet 1.
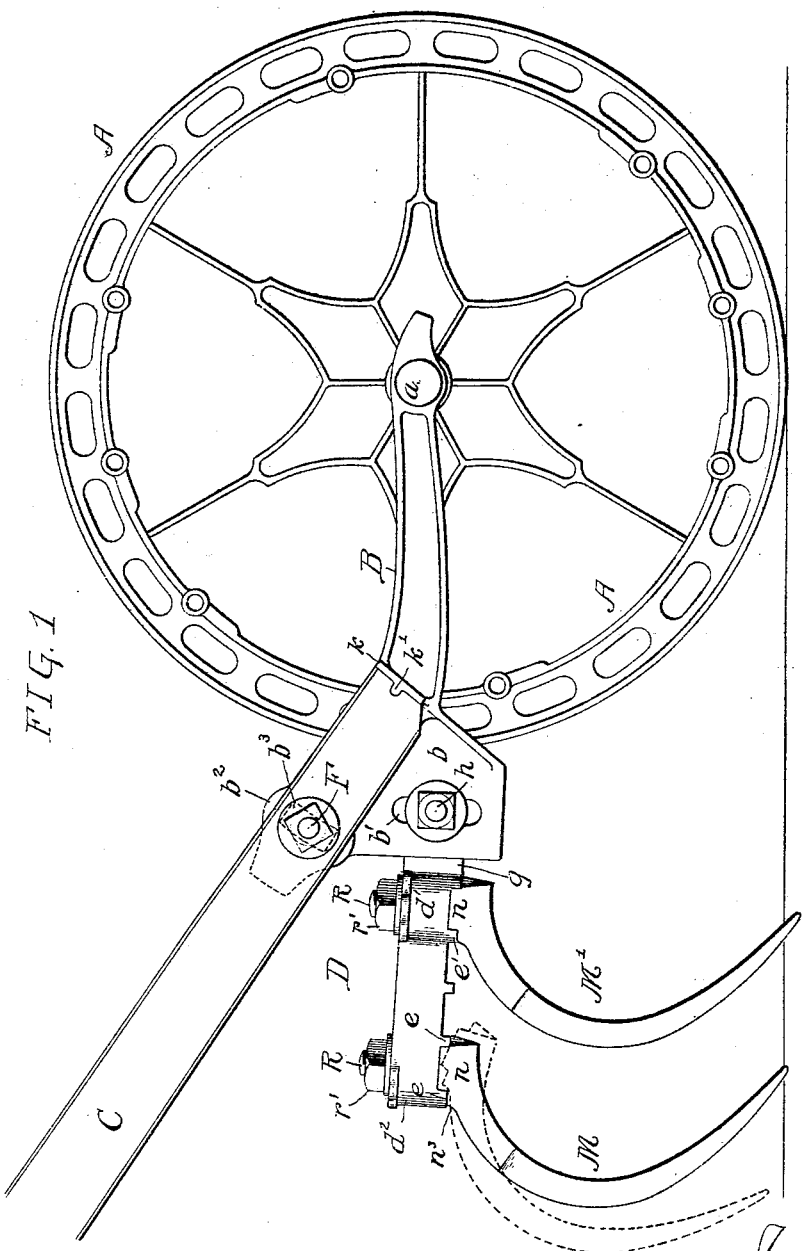
Witnesses:
Jno E Parker
J Killian
Inventor:
Samuel L. Allen,
by his Attorney,
Ennee Petie No. 618,316. Patented Jan. 24, 1899.
S. L. ALLEN.
AGRICULTURAL IMPLEMENT.
(Application filed May 10, 1897.)
(No Model.) 2 Sheets—Sheet 2.
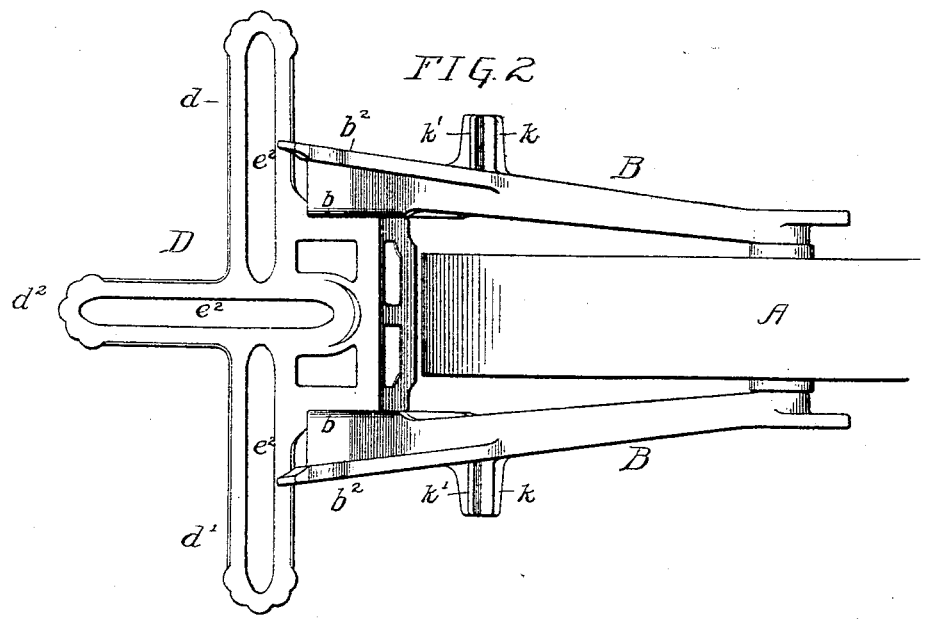
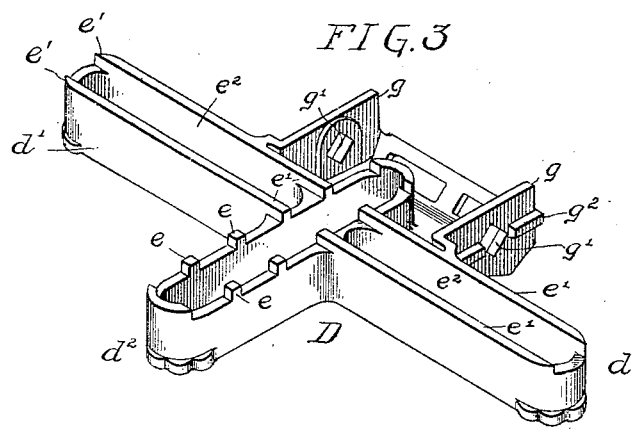
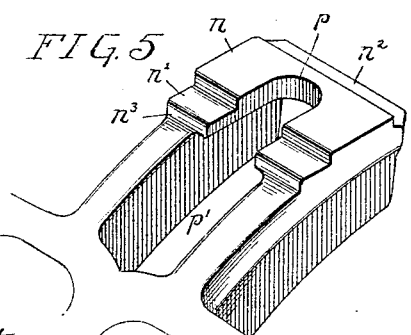
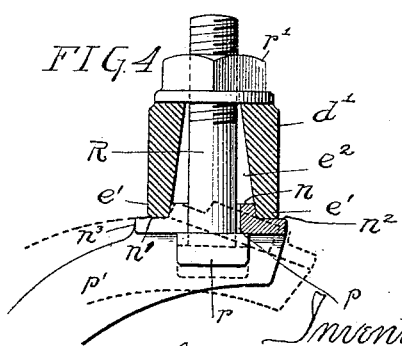
Witnesses:
Jno E Parker
J. Killian
Inventor:
Samuel L. Allen,
by his Attorney,
Horace Pettit

UNITED STATES PATENT OFFICE.

SAMUEL L. ALLEN, OF MOORESTOWN, NEW JERSEY.

AGRICULTURAL IMPLEMENT.

SPECIFICATION forming part of Letters Patent No. 618,316, dated January 24, 1899.

Application filed May 10, 1897. Serial No. 635,949. (No model.)

*To all whom it may concern:*

Be it known that I, SAMUEL L. ALLEN, a citizen of the United States, and a resident of Moorestown, State of New Jersey, have invented certain new and useful Improvements in Agricultural Implements, of which the following is a full, clear, and exact description, reference being had to the accompanying drawings, forming part of this specification.

My invention relates to certain improvements in agricultural implements, and has for its object to provide an improved form of machine which may be used for a variety of purposes, the frame being so constructed that tools of varying character—such as a plow, rake, hoe, cultivator-teeth, and other tools—may be readily secured thereto, thus adapting the implement to use in connection with a variety of classes of agricultural work, as more fully set forth hereinafter.

In the accompanying drawings, Figure 1 is an elevation of a machine constructed in accordance with my invention. Fig. 2 is a plan view of the same with the handles and tools removed therefrom. Fig. 3 is a perspective view of the under side of a portion of the frame of the machine. Fig. 4 is a sectional elevation through a portion of the same, drawn to an enlarged scale and illustrating the manner of fastening a tool to the frame; and Fig. 5 is a perspective view of the head of one of the tools which may be secured to the frame.

Referring to the drawings, A represents the supporting-wheel of the machine mounted on an axis $a$, held between side arms B, to the rear ends of which are secured operating-handles C.

The rear portion D of the frame comprises three arms $d\ d'\ d^2$, in each of which is formed an elongated slot $e^2$, the walls of which are tapered in a manner more clearly illustrated in Fig. 4, in order to permit of the more ready introduction of the bolts which secure the tools to the frame. On the under side of the arm $d^2$ the material is cut away in such manner as to form a series of projections $e$, and the end walls of the arms $d\ d'$ are similarly cut away to form elongated ribs $e'$, the distance between the projections and the ribs being equal throughout the length of the frame.

The forward end of the portion D of the frame has side walls $g$, in which are formed squared openings $g'$ for the reception of the squared ends of securing-bolts $h$, and on either side of and in line with the center of such openings are ribs $g^2$, which are adapted to enter any one of a series of slots or recesses in the inner face of vertical plates $b$, which form an integral part of the arms B. In the plates $b$ are slots $b'$ to permit of vertical adjustment of the parts of the frame when necessary.

The upper rear ends of the arms B are in the form of inclined plates $b^2$, in each of which is formed a segmental slot $b^3$ for the passage of a securing-bolt F, by which the handles are secured in position, and at the juncture of the plates $b^2$ with the main body of the arms are laterally-projecting foot-pieces $k$, having central ribs $k'$ for the reception of the recessed lower ends of the handle-bars. As the rib $k'$ enters the slotted lower end of the handle-bar and the latter is secured in place by the bolt F, I am enabled to dispense with the use of the two bolts usually employed for each handle-bar, while at the same time the height of the handle-bar may be adjusted to a considerable extent when moved with the rib $k'$ as a fulcrum and may be locked in its adjusted position by the bolt F.

The frame is adapted to receive tools of varying character—such as a plow, rake, hoe, or cultivator-teeth—and in Fig. 1 I have illustrated two sets of rake-teeth M M', secured to the frame in different positions in order to illustrate the two positions in which each of the tools may be secured at any one point on the frame.

The head of each of the tools is made in the manner illustrated more clearly in Figs. 4 and 5, in which $n$ represents the upper portion of the tool of a width just slightly less than the distance between adjacent projections or ribs $e\ e'$. At a point just below and on either side of this surface $n$ are bearing-surfaces $n'\ n^2$, which are adapted to bear against the under face of the projections $e$ or ribs $e'$ in the manner shown in Fig. 4. Through the portions $n\ n'$ of the tool is formed a slot $p$ for the passage of the stem of a securing-bolt R, the head of which is rectangular in form and bears against the under surface of the portions $n\ n'$, while the threaded upper end of the bolt passes through one or other of the slots in the frame and is adapted to receive a securing-nut $r'$, by which the tools are firmly fastened in position. In the main body of the head of the tool is a slot $p'$, forming part of, but wider than, the slot $p$, the portion $p$ of the slot being but slightly greater than the diameter of the stem of the securing-bolt, while the portion $p'$ is of a width slightly greater than the smallest diameter of the head $r$ of the bolt, so as to prevent the turning of the latter while the securing-nut $r'$ is being tightened thereon. This construction permits of the adjustment or removal of the various tools without the removal of the nut $r'$ from the threaded end of the bolt, it being merely necessary to loosen the nut sufficiently to permit the withdrawal of the portion $n$ of the tool from the space between the projections or ribs on the under side of the frame, when the tool may be moved forward a sufficient distance to clear the head of the bolt from alinement with the portion $p$ of the slot, when the greater width of the portion $p'$ of the slot allows of the removal of the tool.

On the rear side of the portion $n'$ of the head of the tool is formed a shoulder $n^3$, which permits of the adjustment of the tool to the position shown in dotted lines, Figs. 1 and 4, one of the projections or ribs on the under side of the frame pressing against the top of the tool at the point where the shoulder is formed and its fellow bearing directly upon the upper surface $n$, as shown. This permits of an adjustment of the angle of working of the tool, which is often convenient when several tools are arranged on the frame at different distances from the supporting-wheel.

With a machine constructed in accordance with my invention it is possible to perform work of various kinds, and one form of tool may be readily substituted for another without loss of time.

The machine in part is intended to be manufactured and sold in connection with the seed-sowing machine forming the subject of an application for Letters Patent filed of even date herewith, as the handles, the arms B, and the supporting-wheel are precisely the same as the similar parts described in the said application, and for this tool it is merely necessary to furnish the portion D of the frame and the various plows, hoes, rakes, and other tools which it may be desired to employ.

Having thus described my invention, what I claim, and desire to secure by Letters Patent, is—

1. The combination in an agricultural implement, of the frame, D, having the slotted arms, $d$, $d'$, $d^2$, projections or ribs, $e$, $e'$, formed on the under surface of said arms, a tool-shank the head of which is provided with a portion, $n$, adapted to enter the spaces between the ribs, a series of steps or shoulders, $n'$, $n^3$, to permit of adjustment of the depth of the tool, a slot, $p$, in the head of the tool-shank and a bolt, R, for securing the tool in its adjusted position, substantially as described.

2. The combination in an agricultural implement, of the frame, D, having slotted arms, $d$, $d'$, $d^2$, projections or ribs, $e$, $e'$, formed at equidistant intervals on the under surface of said arms, a tool having portion, $n$, adapted to enter the space between adjacent projections or ribs, the head of said tool being provided with a slot, $p$, $p'$, and a securing-bolt adapted to secure the tool to the frame, substantially as specified.

3. The combination in an agricultural implement, of the carrying-frame, laterally-projecting ribbed foot-rests on said frame, handle-bars adapted to bear against said foot-rests, and bolts for securing said handles in position on the frame.

4. The combination in an agricultural implement, of the frame having outwardly-projecting foot-pieces, $k$, inclined to form rests for the ends of the handle-bars and provided with ribs, $k'$, handle-bars the ends of which are adapted to bear against the said foot-pieces, grooves in the ends of said handle-bars adapted to the ribs, $k'$, and devices for securing said handles to the frame, substantially as described.

5. In an agricultural implement, a tool-holding frame comprising a series of angularly-disposed arms, $d$, $d'$, $d^2$, each having slots for the passage of tool-securing bolts, the under surface of the arms, $d$, $d'$, having elongated ribs, $e'$, to permit of the lateral adjustment of tools, and the under surface of the arm, $d^2$, having equidistant projections, $e$, to permit of the forward and backward adjustment of tools, substantially as specified.

In witness whereof I have hereunto set my hand this 6th day of May, A. D. 1897.

SAMUEL L. ALLEN.

Witnesses:
 JNO. E. PARKER,
 HORACE PETTIT.